Figure 1:
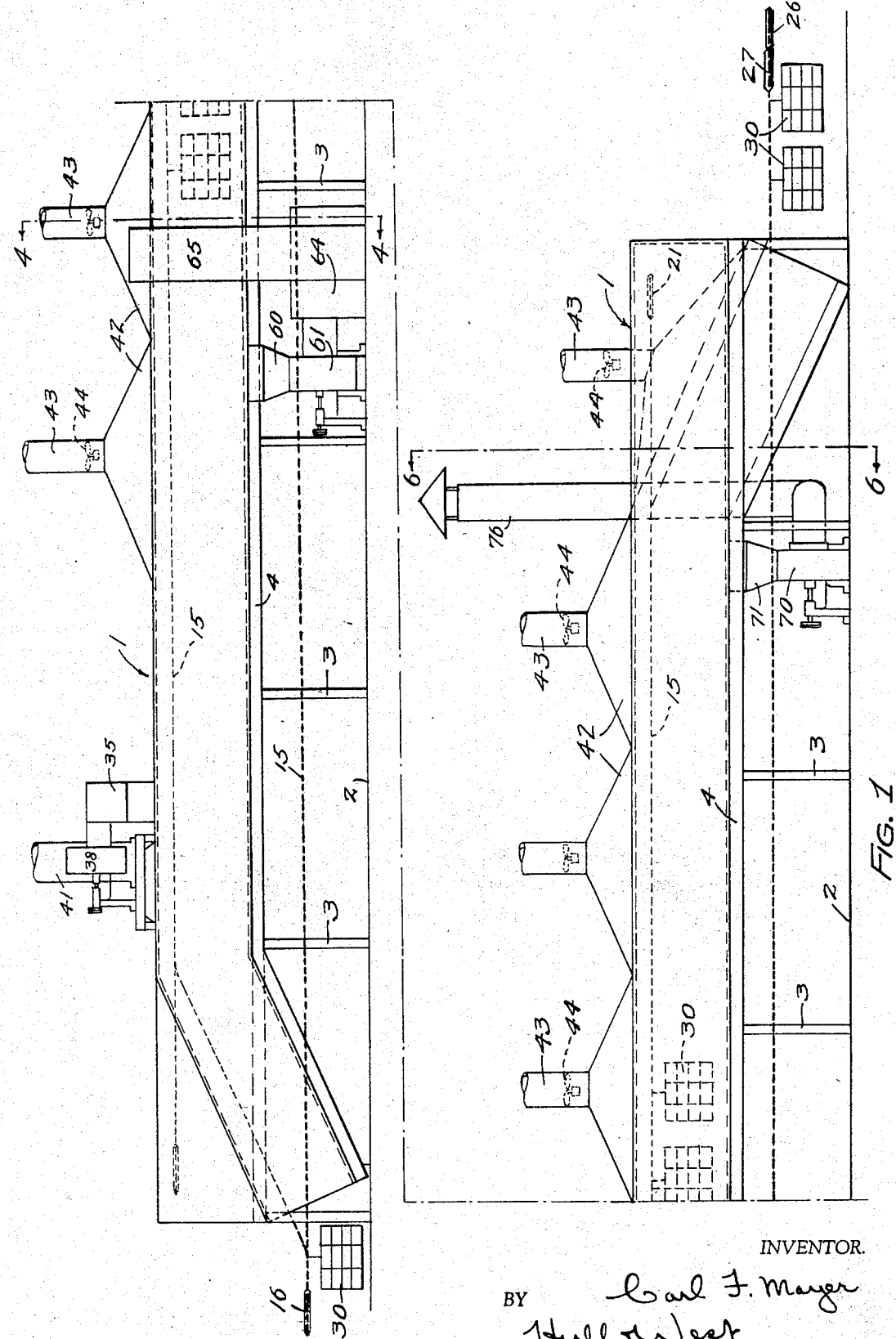

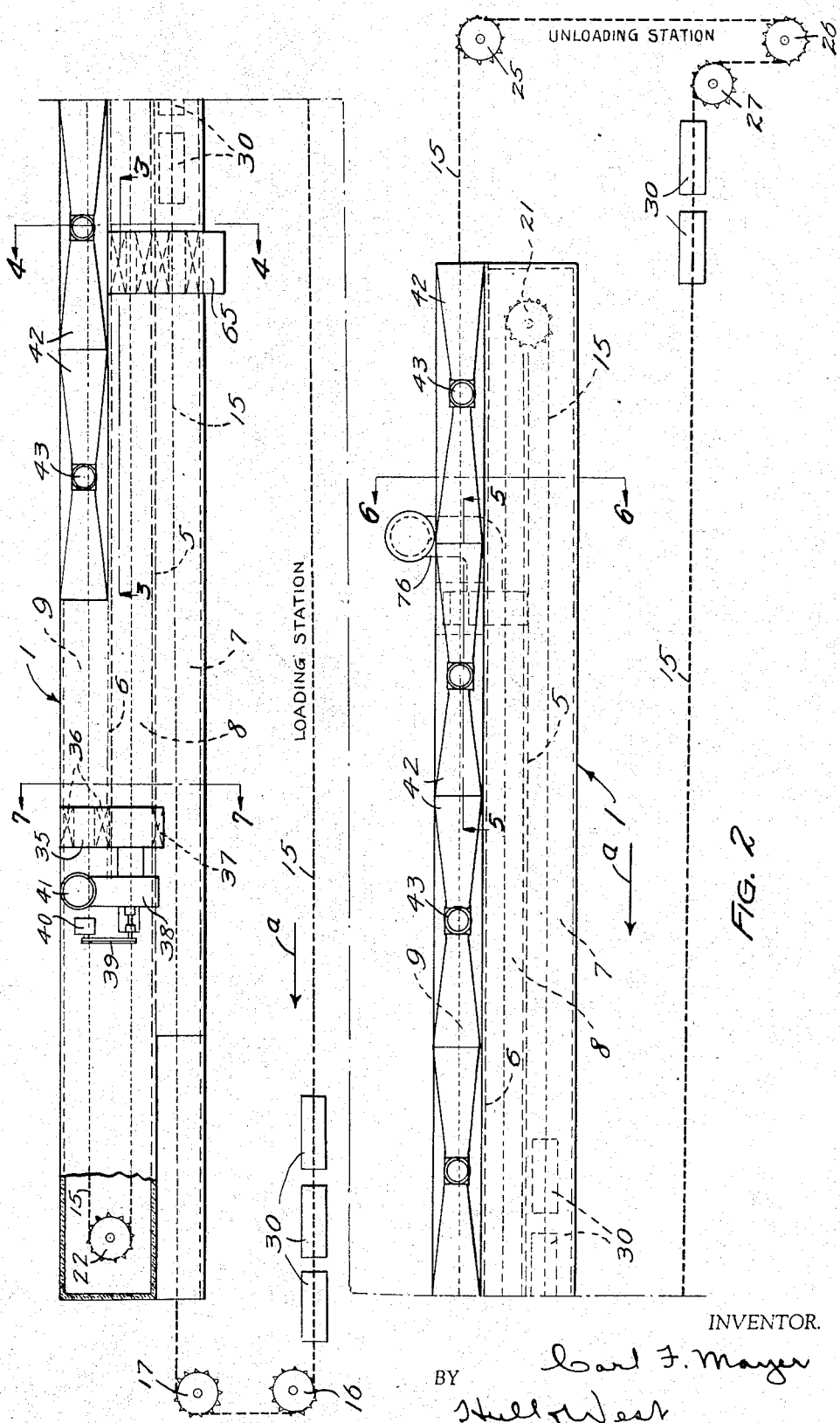

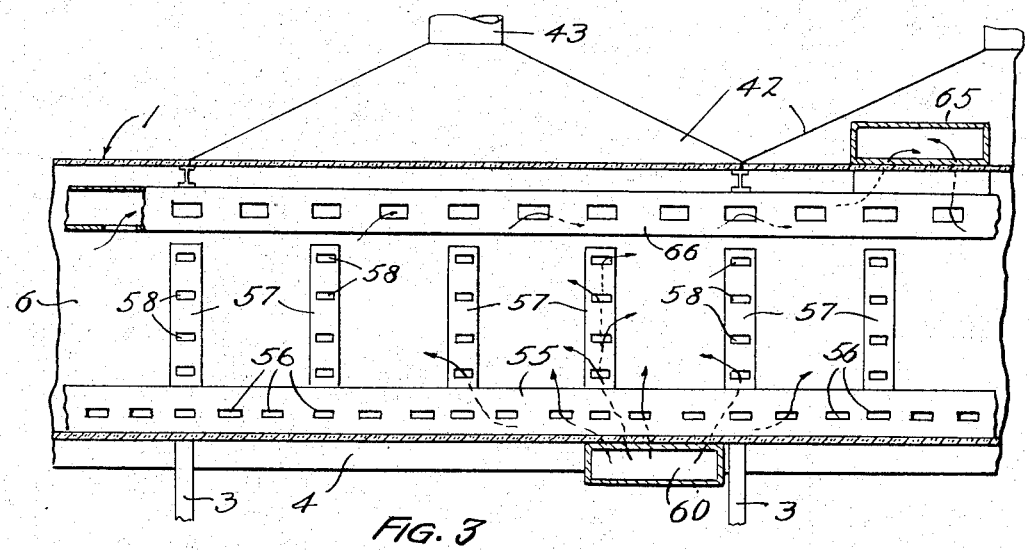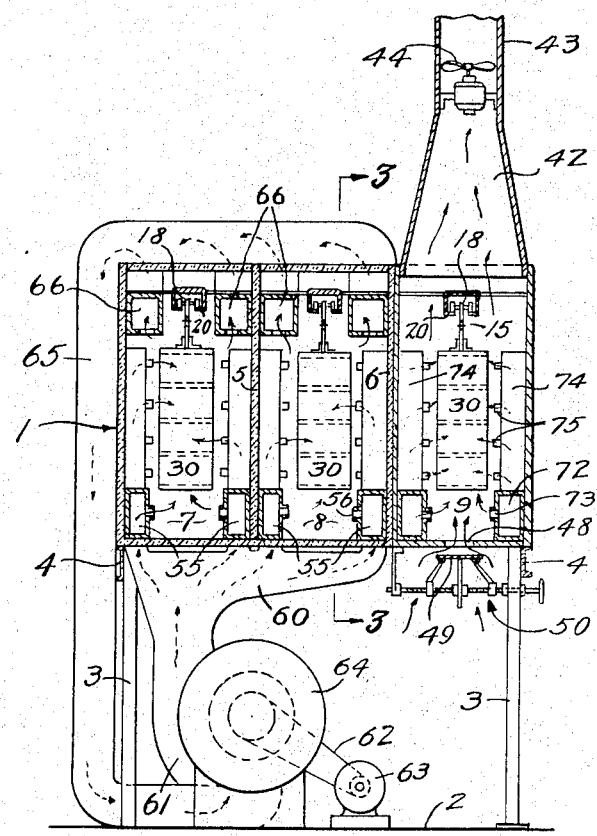

Aug. 15, 1944.   C. F. MAYER   2,355,814
OVEN FOR THE CONTINUOUS BAKING OF CORES OR THE LIKE
Filed Sept. 3, 1942    5 Sheets-Sheet 4

INVENTOR.
Carl F. Mayer
BY
Hull & West
ATTORNEYS.

Aug. 15, 1944.  C. F. MAYER  2,355,814
OVEN FOR THE CONTINUOUS BAKING OF CORES OR THE LIKE
Filed Sept. 3, 1942  5 Sheets-Sheet 5

INVENTOR.
Carl F. Mayer
BY
ATTORNEYS.

Patented Aug. 15, 1944

2,355,814

UNITED STATES PATENT OFFICE 2,355,814

OVEN FOR THE CONTINUOUS BAKING OF CORES OR THE LIKE

Carl F. Mayer, Lakewood, Ohio

Application September 3, 1942, Serial No. 457,176

6 Claims. (Cl. 34—66)

In the baking or drying of intricate cores or molds, such as those used in the casting of air cooled engine cylinders, or similar articles that incorporate numerous relatively thin, deep and closely spaced integral fins, evaporation of the moisture from those portions of the cores or molds that separate the fin cavities, for example, and wherein the moisture seems to concentrate, is very difficult, and the apparatus heretofore employed for the purpose of drying or baking such cores or molds is inadequate to meet the current demand for speed of production.

The fundamental purpose of my invention is to provide an oven for the continuous baking or drying of cores or the like that is extremely efficient and rapid and from which the work is delivered at a relatively low temperature so that by the time it reaches the unloading station it may be readily and comfortably handled. To these ends a tunnel-like passage enclosed by the oven is thermally separate along the course of travel of the work-carriers or racks into a baking or drying zone that is heated to the required high temperature to insure speedy evaporation of the moisture from the work, and a very effectual cooling zone wherein the temperature of the work is rapidly reduced from that at which it leaves the baking or drying zone. Means are provided for withdrawing air from certain regions of the oven that demarcate the limits of the baking or drying zone and that effect a thermal separation of said zone at one end from the entrance area of the oven and at the other from the cooling zone, the air being drawn off in such volume as to avoid appreciable heat leakage from the baking or drying zone to the entrance area and cooling zone. Means are also provided for reheating to a high temperature, recirculating and diffusing air through the baking or drying zone, and further means are provided for circulating cool air, desirably obtained in part or in whole from out of doors, through the cooling zone.

A further object is to provide an arrangement of air distributors or directional means that will cause the air to impinge against the work at such an angle that evaporation of the moisture is enhanced.

The term "air," as herein used, especially with reference to the fluid circulated through the baking or drying zone, is intended to include a mixture of air with such gases or vapors as are driven off in the baking or drying process.

The foregoing objects, with other more limited ones that will appear as this description proceeds, are attained in the embodiment of the invention illustrated in the accompanying drawings wherein like reference characters designate corresponding parts throughout the several views.

Figure 5:
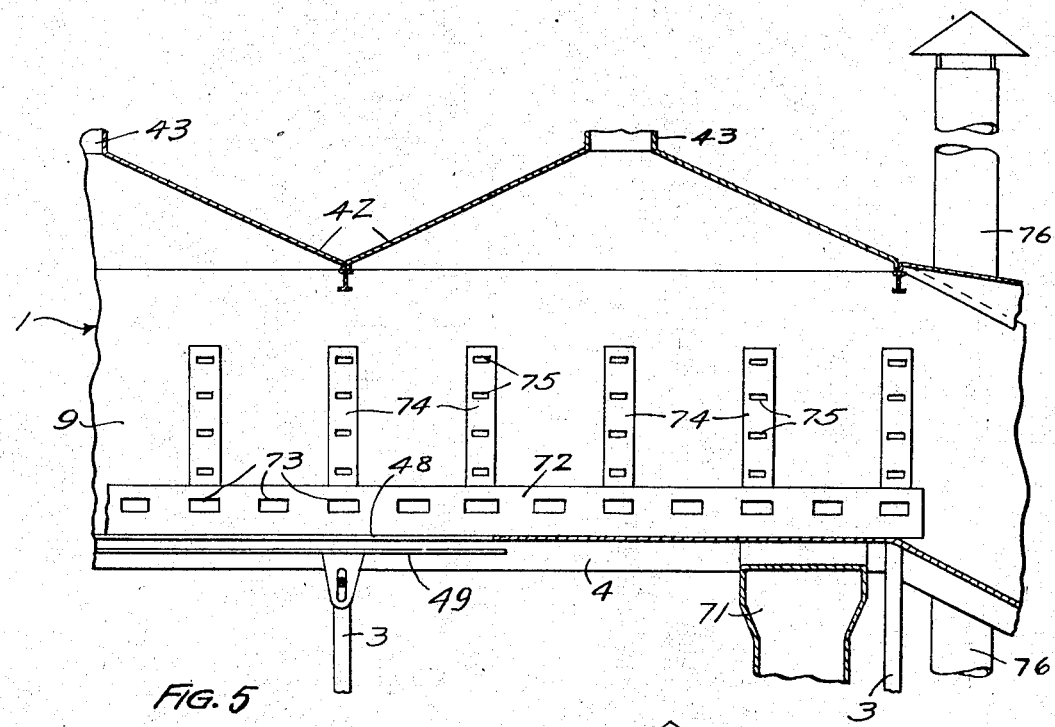
Figure 6:
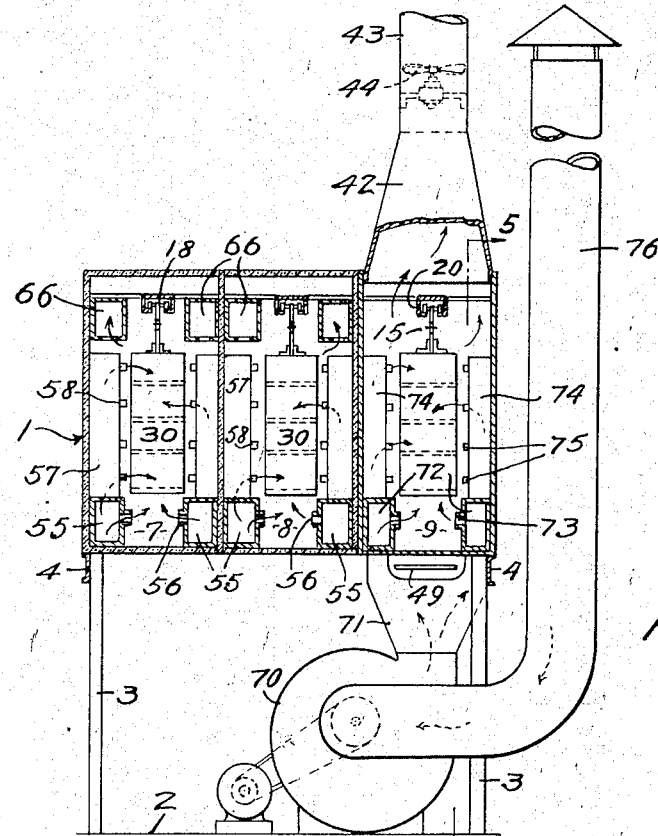
Figure 7:
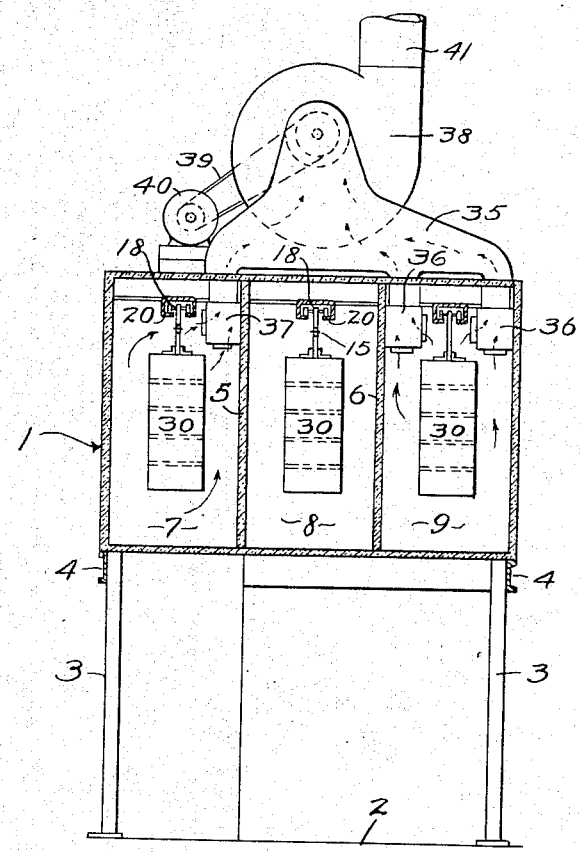

In the drawings, Fig. 1, shown in two parts for the sake of employing a scale larger than could otherwise be used, represents a side elevation of my improved oven for baking or drying cores or the like by the continuous method; Fig. 2, shown in like manner and on the same scale as Fig. 1, represents a plan view of the oven; Fig. 3 is a vertical section taken longitudinally of the oven through a portion of the baking or drying zone, the plane of section being indicated by the lines 3—3 of Figs. 2 and 4; Fig. 4 is a vertical transverse section through the oven on the lines 4—4 of Figs. 1 and 2; Fig. 5 is a vertical section taken longitudinally of the oven through a portion of the cooling zone, the plane of section being indicated by the lines 5—5 of Figs. 2 and 6, and Figs. 6 and 7 are vertical transverse sections through the oven, the planes of the respective sections being substantially as indicated by the lines 6—6 of Figs. 1 and 2, and line 7—7 of Fig. 2.

The oven, designated generally by the reference numeral 1, is an elongated casing that is rectangular in cross section and is desirably supported from the floor 2 at a suitable elevation thereabove by a frame structure including pillars 3 and stringers 4. These parts are shown more or less schematically because the structural details form no part of the invention and may follow prevailing practice. Partitions 5 and 6 extend longitudinally of the oven in laterally spaced relation to each other, the respective partitions stopping short of the right and left hand ends of the oven, as shown in Fig. 2, whereby a continuous tunnel-like passage is provided through the oven. By reason of this partition arrangement, said passage is set off into interconnected corridors 7, 8 and 9. The open or left hand end portion of the corridor 7, and the right hand end portion of corridor 9, are inclined downwardly to substantially floor level, as shown in Fig. 1.

The pieces of work, such as cores, molds or the like are adapted to be carried through the oven by an endless conveying means including work carriers or racks and a chain that connects them and is equipped with supports or trolleys that travel on a suitable track. The conveying means may follow any of several well known constructions and, per se, constitutes no part of the present invention. Accordingly, detailed illustration is deemed unnecessary. The chain of the conveying means, designated 15, is conventionally illustrated in the drawings; and near the left hand end of the oven, as the same is viewed in Figs. 1 and 2, said chain is guided over sprockets 16 and 17 that are rotatably supported in a manner pursuant to common practice, the supporting parts being omitted from the drawings for the sake of clearness. From the sprocket 17 the chain 15 enters the corridor 7, the trolleys 18 of the conveying means traversing a track 20 which, with the trolleys, is shown in the transverse sectional views of Figs. 4, 6 and 7. Proceeding from corridor 7, the chain passes about a sprocket 21 into corridor 8 and thence about a sprocket 22 into corridor 9. Leaving corridor 9 at the right hand end of the oven, the chain 15 passes about a drive sprocket 25, from where it extends about a take-up sprocket 26, and finally about an idler sprocket 27 that is shown as being in such relation to the first mentioned sprocket 16 as to dispose the flight of chain between said sprockets 27 and 16 substantially parallel to the front of the oven. It will be understood that the track 20 follows the entire course of the chain 15 outside as well as inside the oven. By suitable means (not shown), such as an electric motor and appropriate driving connections, the sprocket 25 is driven so as to propel the work conveying means in the direction indicated by the arrows $a$ in Fig. 2. According to the arrangement illustrated, a loading station (so designated in Fig. 2) may be situated along the flight of the conveying means in front of the oven, while an unloading station (so marked) may be located along the flight of the chain between the drive sprocket 25 and the take-up sprocket 26. It will be understood that the latter sprocket is so mounted that it may be shifted bodily toward and from the drive sprocket to take up undue slack in the chain and maintain it in a suitable taut condition. Take-up mechanisms suited to the purpose are common and well known in the art.

Work carriers or racks 30 are spaced equal distances apart throughout the length of the chain 15 and are adapted to sustain the cores, molds, or other pieces of work that are to be baked or dried. The undried pieces of work, such as green cores or molds, are loaded onto the carriers or racks at the loading station and removed therefrom after being dried or baked at the unloading station.

Those walls and partitions of the oven 1 that enclose the baking or drying zone are heat-insulated, as indicated in the drawings, in order to better conserve the heat. Located upon and disposed transversely of the top of the oven near its left hand end is a manifold 35 (Figs. 1, 2 and 7) which communicates with exhaust headers 36 in the rear corridor 9 and a similar header 37 in the front corridor 7. The outlet of the manifold 35 joins the intake of a centrifugal blower 38 that is driven, through a belt 39, by an electric motor 40. Said blower discharges into a stack 41 that preferably leads to the outside of the building, as through the roof. The two exhaust headers 36 define one end, and the exhaust header 37 defines the other end of the baking or drying zone, the part of the corridor 7 in advance of the header 37 constituting the entrance area of the oven, and the portion of the corridor 8 beyond or to the right of the headers 36, as the parts are viewed in Figs. 1 and 2, constituting the cooling zone. Beginning a short distance to the right of the manifold 35, the roof of the oven, throughout the remainder of the corridor 9 (or, in other words, that portion of said corridor which constitutes the cooling zone) is made up of hoods 42, shown as pyramidal, and rising therefrom are stacks 43 within which are exhaust fans 44, preferably driven by individual motors, as indicated. The hoods 42 and the rear wall of the oven throughout the length of said hoods may be constructed of sheet metal so as to enhance dissipation of the heat given off by the work, provided the resultant heating of the space adjoining the oven is not objectionable. The bottom wall of that portion of the oven at present under consideration, also, may be constructed of sheet metal and the same is shown as provided with a longitudinal slot 48, toward and from which a damper 49 is adapted to be adjusted by mechanism designated 50 in Fig. 4.

Extending a suitable distance along that portion of the tunnel-like passage that constitutes the baking or drying zone are supply ducts 55 (Figs. 3 and 4). Said ducts are located adjacent the bottom wall of the oven and at the sides of said passage, the ducts being provided with discharge openings 56. Communicating with and surmounting the ducts 55 are risers 57 that are provided with discharge openings 58. Leading to the supply ducts 55 are branches of a manifold 60 that is located beneath, and is disposed transversely of, the forward portion of the oven beneath the corridors 7 and 8, as best shown in Fig. 4. The manifold 60 is connected to the outlet of a centrifugal blower 61 and is adapted to be driven, through a belt 62, by an electric motor 63. The inlet of the blower 61 has communicative connection with an air heater 64 to which air is conducted, through a conduit 65, from recovery ducts 66 that extend along the front and rear sides of the corridors 7 and 8, near the top thereof, and above the supply ducts 55.

Air is supplied to the cooling zone by a centrifugal blower 70, to the outlet of which is connected a manifold 71 that leads to cold air supply ducts 72. These ducts extend along the front and rear sides of that portion of the corridor 9 that constitutes the cooling zone, said ducts being located adjacent the bottom wall of said corridor. The ducts 72 have discharge openings 73, and communicating with and surmounting said ducts are risers 74, having openings 75. Out-of-door air is desirably supplied to the blower 70 through a stack 76 that is connected at its lower end to the inlet of said blower and leads to the outside of the building, preferably through the roof thereof.

The heater 64 may be of any approved type, and the same is in operation at all times the oven is in use, as are also the centrifugal blowers 38, 61 and 70, and the driving sprocket 25. In the use of the oven, undried work, such as green cores or molds, are placed upon the work carriers or racks 30 at the "loading station," so marked in Fig. 2. As the chain 15, to which the work carriers or racks 30 are connected, moves relatively slowly in the direction of the arrows $a$ in Fig. 2, the work is carried into and through the oven, passing through the entrance area in advance of the exhaust header 37 where the temperature is substantially the same as that surrounding the oven. Immediately after the work passes the header 37, it enters the baking or drying zone to which hot air is supplied from the heater 64 through the blower 61, manifold 60, supply ducts 55 and risers 57, the air from the risers being directed through the openings 58 thereof against the work sustained by the carriers or racks 30. When the work consists of intricate cores or molds of the kind hereinbefore mentioned, the air is effectively projected into the cavities and interstices thereof. As the work proceeds through the corridor 7 and returns to the other end of the oven through corridor 8, it is acted upon by the currents of hot air and is effectively baked or dried by the time it reaches the corridor 9. Simultaneously with the delivery of the highly heated air to the baking or drying zone, the spent air, laden with vapors or gases driven off from the work, is drawn out through the openings of the recovery ducts 66 and is conveyed from said ducts through the conduit 65 to the heater 64. Here the air is reheated, after which it is recirculated through the baking or drying zone. The temperature of the work may drop slightly as the work continues on through the portion of the corridor 9 in advance of the exhaust headers 36, and, passing said headers, it enters the cooling zone. Here, the heat that is given off by the work is quickly dissipated, rising immediately into the elevated space provided by the hoods that form the roof of that portion of the corridor 9 that constitutes the cooling zone. This action is enhanced by the draft through the stacks 43, especially when intensified by the action of the fans 44. At the same time, air, preferably from out of doors, is forced into the cooling zone by the blower 70, the outlet of which is connected, through the manifold 71, with the ducts 72. Identical with the previously described action of the hot air, the cool air is discharged from the openings 75 of the risers 74 in a direction to cause it to impinge against the work supported by the carriers or racks 30. If desired, air may be admitted to the cooling zone through the slot 48 in the bottom wall thereof by lowering the damper 49 by means of the mechanism 50.

While the invention is not limited to any particular size and proportion of parts, or to specific temperatures, it may be explained, in order to convey to those skilled in the art a more definite or practical understanding of the invention that, in the embodiment shown, the oven is approximately 170' long, 17' wide, something over 8' high, and, except for the inclined portions thereof, is sustained by the supporting structure approximately 11 feet above the floor. Sizes of other parts may be judged from the foregoing. A practical baking or drying temperature is around 400 to 450° F., while the cooling temperature may range between 70 and 150° F.

Having thus described my invention, what I claim is:

1. An oven structure enclosing an elongated tunnel-like passage that is open at its ends, one of said ends being the inlet and the other the outlet of said passage, conveying means for continually carrying work through said passage in a direction from said inlet toward said outlet, the oven structure being such that said passage turns back and forth upon itself to provide a plurality of corridors disposed in side by side relation, exhaust means communicating with different corridors at locations remote from each other along the passage but adjacent each other transversely of the oven structure, a relatively short manifold communicating with said exhaust means of the different corridors, suction means wherewith the outlet of the manifold communicates, the portion of the passage between the aforesaid locations constituting a heating zone, the said zone including parts of adjacent corridors, one of the aforesaid locations being distant from the outlet of the passage and the portion of the passage between the last mentioned location and said outlet constituting a cooling zone, air supply means and air recovery means extending along said heating zone, an air heating and circulating system comprising air heating means and air impelling means and conduits leading from said air heating and impelling means to the aforesaid air supply and recovery means, the conduits including manifolds disposed transversely of the oven structure and communicating with said air supply and recovery means of adjacent corridors, and means for forcing fresh air through the cooling zone.

2. An oven enclosing an elongated tunnel-like passage that is open at its ends, one of said ends being the inlet and the other the outlet of said passage, conveying means for continually carrying work through said passage in a direction from said inlet toward said outlet, exhaust means communicating with said passage at a location intermediate its ends, the portions of the passage between its inlet and said location and between said location and its outlet constituting, respectively, a heating zone and a cooling zone, means for heating and circulating air through the heating zone, means for exhausting air from the cooling zone, air supply ducts extending along the sides of the cooling zone adjacent the bottom thereof, risers surmounting and communicating with said supply ducts, the risers being provided with openings, and work supports incorporated in the aforesaid conveying means that are arranged to sustain the work in such relation to the openings of the aforesaid risers as to cause the air currents issuing from said openings to impinge against certain parts of the work.

3. An oven enclosing an elongated tunnel-like passage that is open at its ends, one of said ends being the inlet and the other the outlet of said passage, exhaust means communicating with said passage at locations remote from each other therealong, the portion of the passage between said locations constituting a heating zone, one of said locations being distant from the outlet of the passage and the portion of the passage between said one location and said outlet constituting a cooling zone, air supply ducts and air recovery ducts extending along the heating zone, the same being provided with openings, the supply ducts being adjacent the bottom and the recovery ducts adjacent the top of said heating zone, risers communicating with the supply ducts and extending upwardly on opposite sides of the heating zone, the risers being provided with openings, work carrying means for continually conveying work through the passage and for supporting it in such relation to the openings of the aforesaid risers as to cause the air currents issuing from said openings to impinge against certain parts of the work, and means for forcing fresh air through the cooling zone.

4. An oven structure enclosing an elongated tunnel-like passage that is open at its ends, one of said ends being the inlet and the other the outlet of said passage, conveying means for continually carrying work through said passage in a direction from said inlet toward said outlet, the oven structure being such that said passage turns back and forth upon itself to provide a plurality of corridors disposed in side-by-side relation, exhaust means communicating with different corridors at locations remote from each other along the passage but adjacent each other transversely of the oven structure, a relatively short manifold communicating with said exhaust means of the different corridors, suction means wherewith the outlet of the manifold communicates, the portion of the passage between the aforesaid locations constituting a heating zone, the said zone including parts of adjacent corridors, air supply means and air recovery means extending along said heating zone, and an air heating and circulating system comprising air heating means and air impelling means and conduits leading from said air heating and impelling means to the aforesaid air supply and recovery means, the conduits including manifolds disposed transversely of the oven structure and communicating with said air supply and recovery means of adjacent corridors.

5. An oven structure enclosing an elongated tunnel-like passage that is open at its ends, one of said ends being the inlet and the other the outlet of said passage, the oven structure being such that said passage turns back and forth upon itself to provide a plurality of corridors disposed in side-by-side relation, exhaust means communicating with different corridors at locations remote from each other along the passage but adjacent each other transversely of the oven structure, a relatively short manifold communicating with said exhaust means of the different corridors, suction means wherewith the outlet of the manifold communicates, the portion of the passage between the aforesaid locations constituting a heating zone, the said zone including parts of adjacent corridors, air supply ducts and air recovery ducts extending along the heating zone, the supply ducts and recovery ducts being provided with openings, the supply ducts being adjacent the bottom and the recovery ducts adjacent the top of said zone, risers communicating with the supply ducts and extending upwardly on opposite sides of the heating zone, the risers being provided with openings, an air heating and circulating system comprising air heating means and air impelling means and conduits leading from said air heating and impelling means to the aforesaid air supply ducts, and work carrying means for continually conveying work through the passage and for supporting it in such relation to the openings of the aforesaid risers as to cause the air currents issuing from said openings to impinge against certain parts of the work.

6. An oven enclosing an elongated tunnel-like passage that is open at its ends, one of said ends being the inlet and the other the outlet of said passage, conveying means for continually carrying work through said passage in a direction from said inlet toward said outlet, exhaust means communicating with said passage at a location intermediate its ends, the portions of the passage between its inlet and said location and between said location and the outlet of the passage constituting, respectively, a heating zone and a cooling zone, means communicating with the heating zone adjacent the top thereof for recovering air from said zone, means adjacent the top of the cooling zone for exhausting air from said zone, air supply ducts extending along the sides of both the heating zone and the cooling zone adjacent the bottoms thereof, risers surmounting and communicating with said supply ducts, the risers being provided with openings, air heating means, a conduit leading therefrom to the air supply ducts of the heating zone, means for supplying air to the supply ducts of the cooling zone, and work supports incorporated in the aforesaid conveying means that are arranged to sustain the work in such relation to the openings of the aforesaid risers as to cause the air currents issuing from said openings to impinge against certain parts of the work.

CARL F. MAYER.